United States Patent
Beisel et al.

(10) Patent No.: US 10,246,268 B2
(45) Date of Patent: Apr. 2, 2019

(54) CONTAINER CONVEYOR COMPRISING CONNECTING ELEMENTS

(71) Applicant: KHS GmbH, Dortmund (DE)

(72) Inventors: Michael Beisel, Schöneberg (DE); Marcus Krauth, Windesheim (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/781,852

(22) PCT Filed: Nov. 14, 2016

(86) PCT No.: PCT/EP2016/077554
§ 371 (c)(1),
(2) Date: Jun. 6, 2018

(87) PCT Pub. No.: WO2017/097538
PCT Pub. Date: Jun. 15, 2017

(65) Prior Publication Data
US 2018/0334335 A1    Nov. 22, 2018

(30) Foreign Application Priority Data

Dec. 10, 2015 (DE) .................. 10 2015 121 530

(51) Int. Cl.
*B65G 47/84* (2006.01)
*B67C 3/22* (2006.01)
*F16B 7/04* (2006.01)

(52) U.S. Cl.
CPC .............. *B65G 47/846* (2013.01); *B67C 3/22* (2013.01); *F16B 7/048* (2013.01); *B65G 2207/30* (2013.01)

(58) Field of Classification Search
CPC ...... B65G 21/02; B65G 21/06; B65G 47/846; B65G 2207/30; B65G 47/84; F16B 7/048; F16B 7/185; F16B 7/0486; F16B 7/0493; F16M 5/00; B67C 3/22; B67C 7/00; B65C 9/00; B65C 9/0062
USPC .............................. 198/470.1, 860.1, 861.1
See application file for complete search history.

(56) References Cited

U.S. PATENT DOCUMENTS

| | | | | |
|---|---|---|---|---|
| 3,888,446 A * | 6/1975 | O'Brien | ................ | F16B 7/0486 248/230.1 |
| 7,731,022 B2 * | 6/2010 | Zepf | .................... | B65G 47/846 198/469.1 |
| 7,743,907 B2 * | 6/2010 | Weinbrenner | ............ | B67C 3/22 141/144 |
| 8,047,357 B2 * | 11/2011 | Braun | .................... | B65G 29/00 198/469.1 |
| 8,500,084 B2 * | 8/2013 | Cavazzini Gainotti | ...................... | B67C 7/002 198/478.1 |
| 8,789,688 B2 * | 7/2014 | Zoni | ....................... | B67C 7/002 198/860.1 |
| 2008/0258034 A1 * | 10/2008 | Zepf | .................... | B65G 47/846 248/637 |

(Continued)

FOREIGN PATENT DOCUMENTS

| | | |
|---|---|---|
| DE | 20 2005 002470 | 11/2005 |
| DE | 10 2011 083973 | 4/2013 |

(Continued)

*Primary Examiner* — James R Bidwell
(74) *Attorney, Agent, or Firm* — Occhiuti & Rohlicek LLP (57) ABSTRACT

A container conveyor has a conveying elements and a connecting elements. The connecting element has a cut-out opening that receives a portion of the conveyor element's housing and clamps to it.

20 Claims, 9 Drawing Sheets

(56) References Cited

U.S. PATENT DOCUMENTS

2011/0233376 A1* 9/2011 Cavazzini Gainotti ... B67C 3/22
                                                          248/639

FOREIGN PATENT DOCUMENTS

| DE | 10 2012 000 881 | 6/2013 |
| EP | 1 645 537 | 4/2006 |
| WO | WO2010/009767 | 1/2010 |
| WO | WO2010/013263 | 2/2010 |
| WO | WO2011/010331 | 1/2011 |
| WO | WO2011/161704 | 12/2011 |

* cited by examiner

CONTAINER CONVEYOR COMPRISING CONNECTING ELEMENTS

RELATED APPLICATIONS

This application is the national stage entry under 35 USC 371 of international application PCT/EP2016/077554, filed on Nov. 14, 2016, which claims the benefit of the Dec. 10, 2015 priority date of German application DE 102015121530.6, the contents of which are herein incorporated by reference.

FIELD OF INVENTION

The invention relates to container processing, and in particular to conveyors for conveying containers.

BACKGROUND

A container-processing system typically includes a conveying system to move containers from one place to another. Such a system often has a set of star wheels. The star wheels suspend containers on peripheries thereof.

The star wheels are placed adjacent to each other and made to rotate in opposite directions. At the point where two adjacent star wheels are tangent, it is possible for a container to be transferred from one star wheel to the next. This makes it possible to move the container along a sinuous path from one star wheel to the next.

Conveying systems of this type must be assembled, cleaned, and maintained. It is therefore useful to design such a system so that these tasks are easier to carry out.

A container conveyor can include a front table, a container inlet, and a container outlet of a container treatment machine with the machine frame of which the columnar or tubular conveyor element housing of a conveying element is mechanically connected by a connection element.

In other examples, a container conveyor forms a container-conveying segment with at least two conveying elements that are connected to one another in a container-conveying direction and to which columnar or tubular conveying-element housings are mechanically connected by at least one connecting element to form a conveying-element combination or a container-conveying segment.

The conveying element is preferably configured for conveying in a way that applies no force to the container's base. An example of this would be conveying suspended containers.

A typical conveying element is a star that rotates about a vertical machine axis. The star has container receptacles for suspending containers. In the case of bottles, the receptacles suspend the bottles from a flange or neck ring formed at the bottle's neck.

A container-conveying segment can comprise a plurality of conveying stars or conveying elements connecting to one another in a container conveying direction. These stars can have different diameters. In such container conveying segments, it is useful to promote precise alignment of the elements carrying, guiding, and conveying the containers and to provide the simplest possible access to the container conveying segment for cleaning, repair, or inspection.

SUMMARY

An object of the invention is to provide a container conveyor that comprises at least one conveying element in the form of a conveying star, but preferably at least two conveying elements following one another in a container-conveying direction and connected to one another, and with which, secured to the columnar or tubular conveying element housing of the at least one conveying element, is a tubular connecting element, projecting from this housing, for a mechanical connection to a container treatment machine or to a columnar or tubular housing of a further conveying element, wherein the tubular connection or the mechanical union between the respective conveying element housing and the connecting element can be achieved with low structural design and technical installation effort and expenditure.

With the invention, a connection between the connecting element and the columnar or tubular conveying element housing is achieved by bracing or clamping. As a result of this, it is also possible, even without elaborate welded and/or machined connections, connecting flanges, or intermediate connections, etc., for the container conveyor, which comprises plural conveying elements, to be realized in the required geometry. The conveying elements are preferably configured as conveying stars for base-neutral and suspended conveying of containers.

The assembly of the container conveyor according to the invention is made substantially easier by doing away with intermediate connections. The columnar or tubular conveying element housings, oriented in the vertical direction and provided in which, in turn, are the drives and bearings for the conveyor wheels comprising the container receptacles, for the realization of the respective connection or the respective tubular connection, are inserted laterally into cut-out openings that are provided at the tubular connecting elements and that are then bolted or clamped to the connecting element. This is carried out in such a way that the connecting element, at least in the region of the connection, is oriented with its longitudinal extension tangential or essentially tangential to a circle surrounding the axis of the columnar or tubular conveying element housing, or oriented tangentially or essentially tangentially to the circumferential surface of this conveying element housing.

Preferably, a clamping bar clamps the connecting element to the conveying element housing, which then engages around the conveying element housing at a part of its circumference that is unoccupied by the cut-out opening.

To stabilize the connecting element, spacing elements are preferably provided in this element on both sides of the cut-out opening accommodating the respective columnar or tubular conveying-element housing, which, when the bolting or clamping is carried out, causes the drawing-in or folding-in of the tubular connecting element.

The exact orientation of the connecting element in relation to the respective conveying-element housing takes place preferably by way of pin guidance, i.e. by having at least one centering pin engage a centering opening. The centering pin is provided, for example, at the clamping bar. The centering opening is provided in the conveying element housing. In an alternative embodiment, the pin is provided at the conveying-element housing and the opening is provided at the clamping bar.

In order to seal the connection, i.e. in order to seal the transition between the connecting element and the conveying-element housing, but also in order to seal the centering opening provided in the conveying-element housing, seals are provided. These are, for example, specially formed seals, or seals which are separated, for example, by strip or web-shaped sealing material. The seal provided in the region of the pin guidance is not perforated until the installation of the centering pin at that location. There is no need for a prepared opening for the centering pin.

The respective tubular connecting element also serves preferably for the protected accommodation of lines, for example of control and/or supply lines, for example also for accommodating lines for cooling, lubrication, and/or pressure media, and/or for accommodating electrical supply and control lines or cables. These lines are then preferably guided spatially separated inside the connecting element, and also extend through at least one opening provided at the respective connection into the conveying-element housing.

At the tubular connections or unions, preferably noses are molded or melted with a laser onto the connecting elements, the purpose of which is to provide an additional metallic contact and therefore an additional shape and location fixing of the connecting element to the conveying-element housing concerned.

The ends of the respective tubular connecting element are preferably closed by slid-on caps which carry seals. These caps can be removed at any time, in order to allow access to the interior of the connecting element, for example for inspection purposes and/or for the laying of further lines or cables. No screws or flanges are necessary for this closing of the connecting elements either.

Slid onto the lower ends of the columnar conveying-element housing in each case is the support foot of the conveying element, provided with a closure cover, and fixed in place there by an O-ring. In the operational state of the conveying element, no forces whatever arise, and fluids flow without any hindrance. Inserted into the upper end of the columnar or tubular conveying-element housing is the respective drive element, above a flange, and secured laterally by screws.

The conveying-element housing, the connecting elements, and the elements required for the respective bracing or clamping connection, are made of a suitable metallic material, preferably of a corrosion-resistant steel.

Because of its reliance on tubular elements for the conveying-element housing, the apparatus is particularly economical to manufacture and simple to assemble. This reduces assembly errors.

Because of its reliance on tubular connections, the orientation is inherently provided.

In addition, the apparatus provides protected accommodation of supply and/or control lines, and also of media lines for conveying of fluids inside and through at least one connecting element and at least one housing.

The apparatus also offers surfaces that are easy to clean and simple cleaning, inspection, and/or repair, for example for replacing seals. Metallic contact in the region of the pin permit precise component alignment.

Such an apparatus is suited as container conveying systems or container conveyors for a base-neutral conveying of containers and can be manufactured with high manufacturing quality thanks to the use of tube laser machines on the vertical tubes forming the conveying-element housing, as well as on the horizontal tubes forming the connecting elements.

In some embodiments, the connection angle of the connecting elements about the vertical axis is variable.

The invention also allows for flexible structural design matching, thanks to which development times for type-related geometries of container conveyors or container conveying segments can be saved.

"Container treatment machines or devices" in the meaning of the invention are, in particular, such for the cleaning, disinfecting, filling, closing, labeling, and printing of containers, but also machines or devices for manufacturing containers in the form of bottles made of plastic, preferably from PET, in particular by blow-molding or stretch-molding.

As used herein, "container-treatment systems" refer to systems that comprise at least one container-treatment machine or at least one container-treatment device.

As used herein, "containers" include cans, bottles, tubes, pouches, in each case made of metal, glass, and/or plastic, and also other packaging means, in particular those that are suitable for the filling of powdered, granulated, fluid, or viscous products.

As used herein, "cylindrical outer surface" and "casing surface" refer to the conveying-element housing, at least in the region of the tube connection or of the union with the connecting element, where the housing has a constant or essentially constant outer diameter along its axis and forms there a convex outer surface or casing surface that is preferably a circular cylinder or essentially a circular cylinder.

As used herein, the expression "essentially" or "approximately" signifies deviations from an exact value in each case by ±10%, preferably by ±5%, and or deviations in the form of changes that are not of significance for the function.

Further embodiments, advantages, and application possibilities of the invention are also derived from the following description of exemplary embodiments and from the figures. In this context, all the features described and/or represented in image form are essentially the object of the invention, alone or in any combination, regardless of their relationship in the claims or reference to them. The contents of the claims are also considered to be constituent parts of the description.

BRIEF DESCRIPTION OF THE DRAWINGS

These and other features of the invention will be apparent from the following detailed description and the accompanying figures, in which.

DETAILED DESCRIPTION

Figure 1:
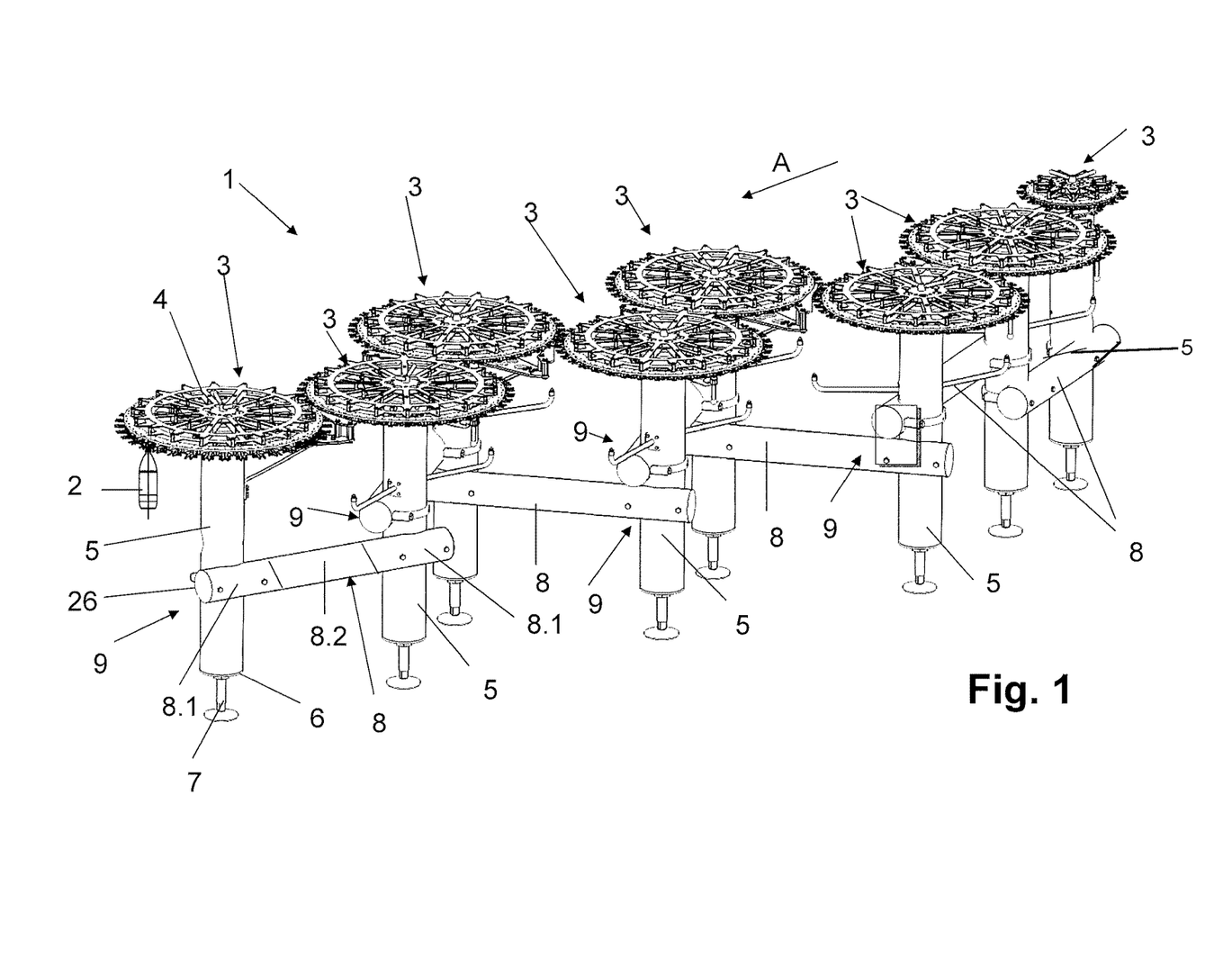
FIG. 1 shows a conveyor that transports suspended bottles.

FIG. 1 shows a container conveyor 1 for conveying suspended containers. In some embodiments, the containers are bottles. In some of these embodiments, the bottles are plastic bottles. Among the plastics used to make such bottles is PET (polyethylene terephthalate).

The container conveyor 1 includes stars 3 that couple to each other to convey containers along a conveying direction A. The stars 3 are arranged such that a container passes from one star 3 to another at a transition region.

Each star 3 has a rotor 4 that rotates about a vertical machine axis and container receptacles around a periphery thereof. Each receptacle suspends a container from a flange around a neck thereof.

Each star 3 has a tubular housing 5. In the embodiment shown, the tubular housing 5 is a circular cylinder that extends coaxially with the machine axis about which the rotor 4 rotates. The rotor 4 is mounted at the top of the housing 5. An electric motor rotates the rotor 4.

A cover 6 seals the tubular housing 5 at its lower end. A height-adjustable foot 7 projects down from the housing 5.

Connecting elements 8 connect each pair of housings 5. Each connecting element 8 is a tube that extends horizontally between connections 9 that connect it to adjacent housings 5. The connecting elements 8 form a stable tube-structure.

To promote stability, the longitudinal axes of two connecting elements 8 secured to the same housing 5 form an angle relative to each other. As used herein, "angle" excludes 180 degrees.

To achieve such an angle, the housings 5 are offset in both an offset direction A and in a direction that is both transverse to the offset direction A and in a plane normal to the vertical machine axis. A clamp or brace connects each end of the connecting element 8 to the corresponding housing 5 so that the connecting element 8, and in particular, its longitudinal axis, is tangent to a curve defined by the housing 5.

FIGS. 2-7 show a connection 9 in greater detail.

As shown in the figures, each connecting element 8 has two ends. Each end has cut-out opening 10 that has been formed, typically by laser cutting. This cut-out opening 10 permits the connecting element to accommodate at least a portion of the housing 5. In some embodiments, the cut-out opening 10 accommodates 180 degrees of the housing's circumference. This permits the connecting element's longitudinal axis to be made tangent to a circle defined by the housing 5.

Figure 6:
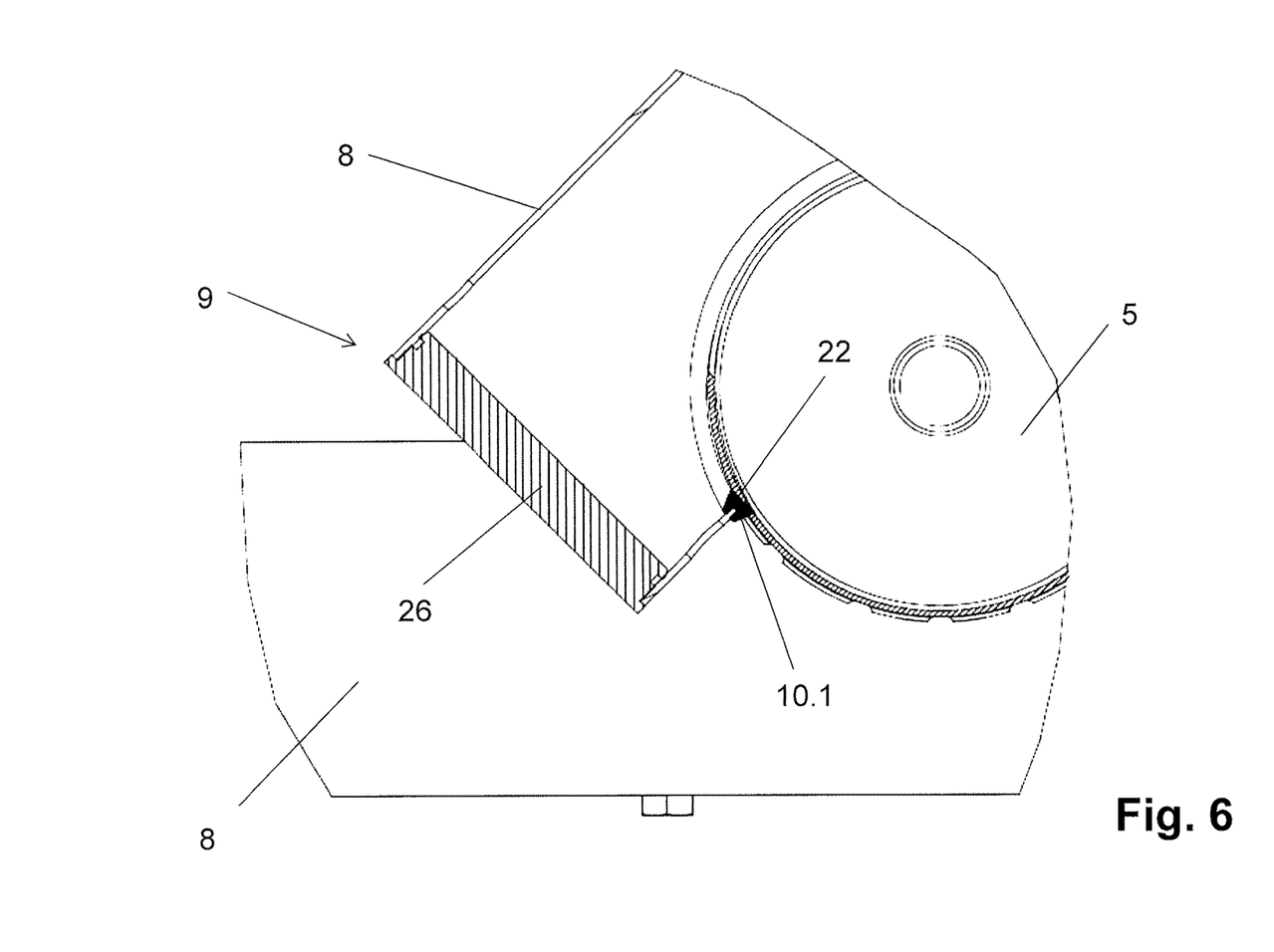
FIG. 6 shows a seal that seals a transition between a housing and a connecting element.
Figure 7:
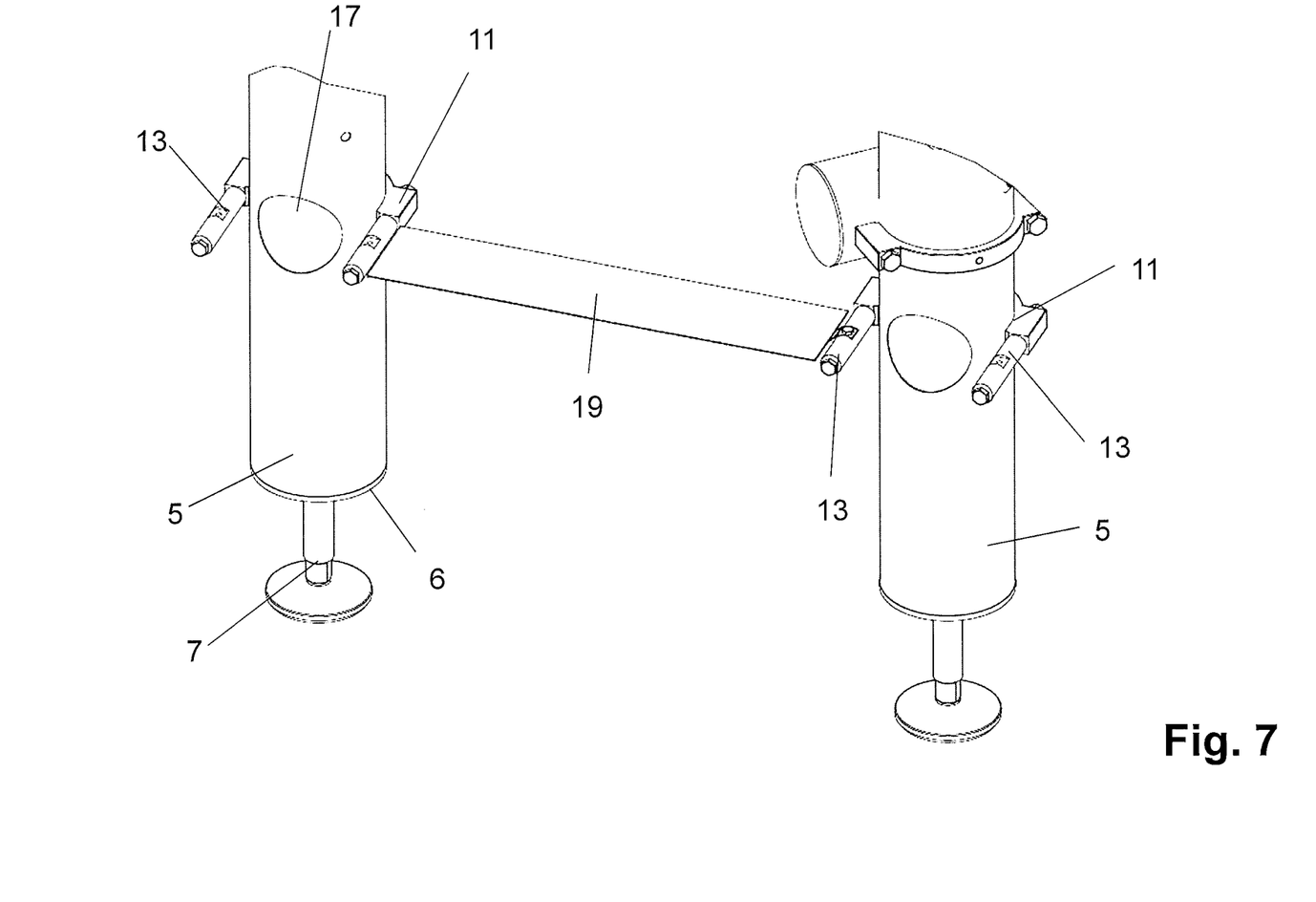
FIG. 7 shows housings of two adjacent conveyors together with a separation insert.

As shown in FIG. 6, it is particularly useful for the cut-out opening 10 to have two part-circular concave edge regions 10.1 that cooperate to define a surface having a radius of curvature essentially equal to the housing's radius of curvature at the connection 9. This promotes a snug fit.

Figure 2:
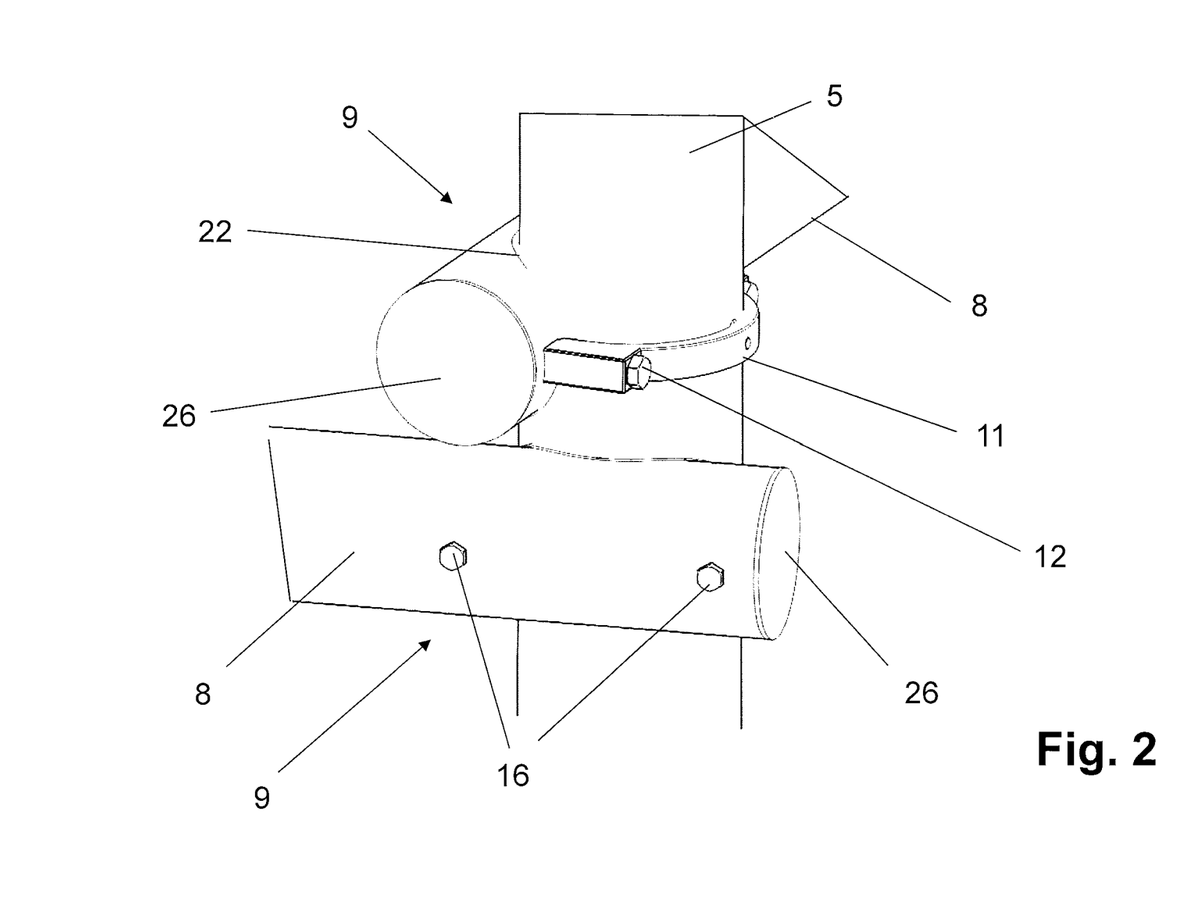
FIG. 2 shows a connection between a housing and two tubular connecting elements.
Figure 4:
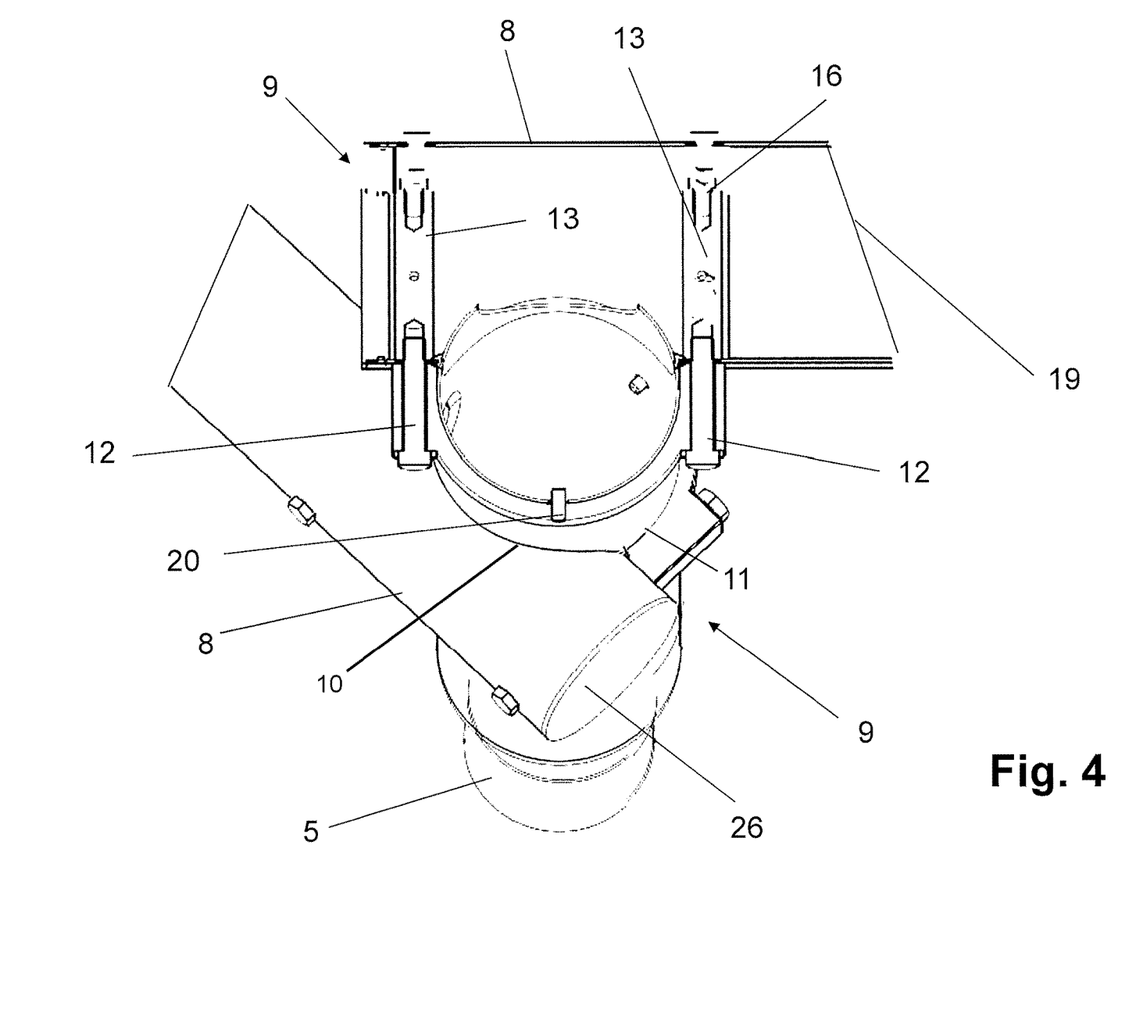

As shown in FIG. 2, a clamping bar 11 provides the final mechanical connection between the connecting element 8 and the housing 5. The clamping bar 11 engages around the housing 5 on the side facing away from the connecting element 8. As shown in FIG. 4, first and second clamping screws 12 at corresponding first and second ends of the clamping bar 11 engage a thread of a spacing element 13.

Each spacing element 13 extends like a bolt with its axis transverse or perpendicular to the connecting element's longitudinal axis. Each connection 9 has spacing elements 13 inside the connecting element 8 on both sides of the cut-out opening 10 so that they are offset along the longitudinal axis of the connecting element 8.

Figures 8, 9:
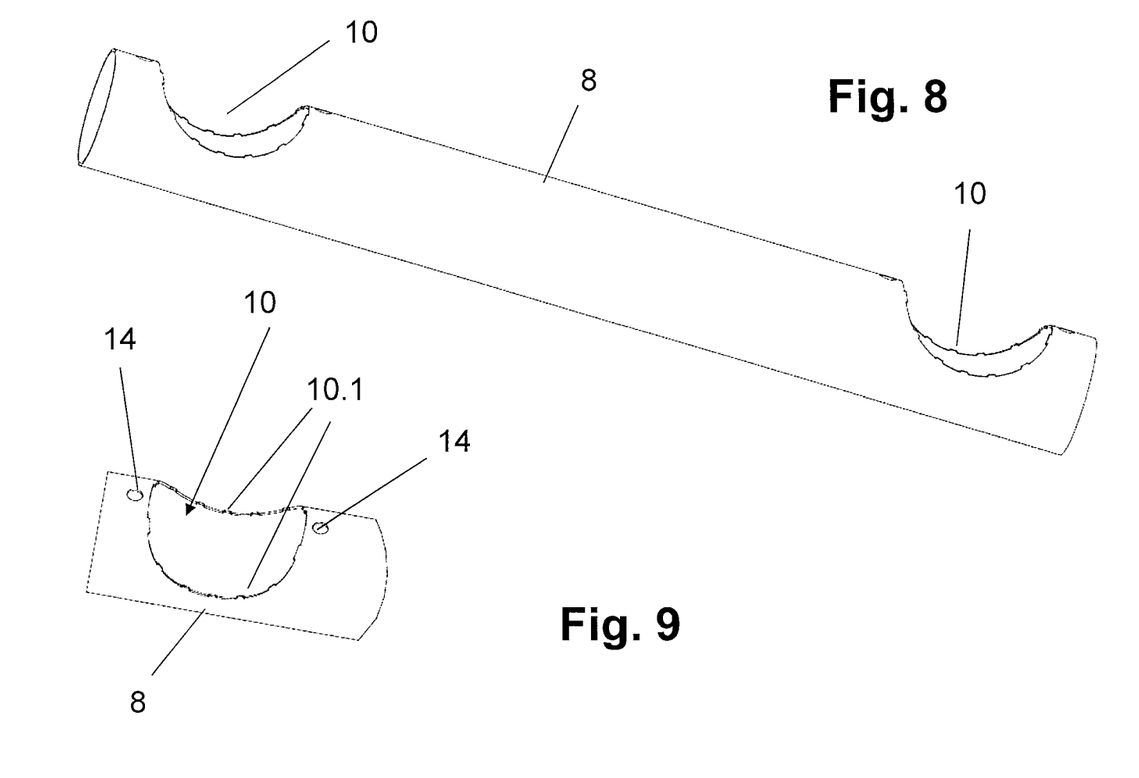
FIG. 8 shows a connecting element from FIG. 1.
FIG. 9 shows an end of the connecting element from FIG. 8.

Referring to FIG. 9, each end of the connecting element 8 has first and second openings 14 to receive the corresponding first and second screws 12. The first and second openings 14 are offset relative to each other along the connecting element's longitudinal axis on either side of the cut-out opening 10.

Figure 3:
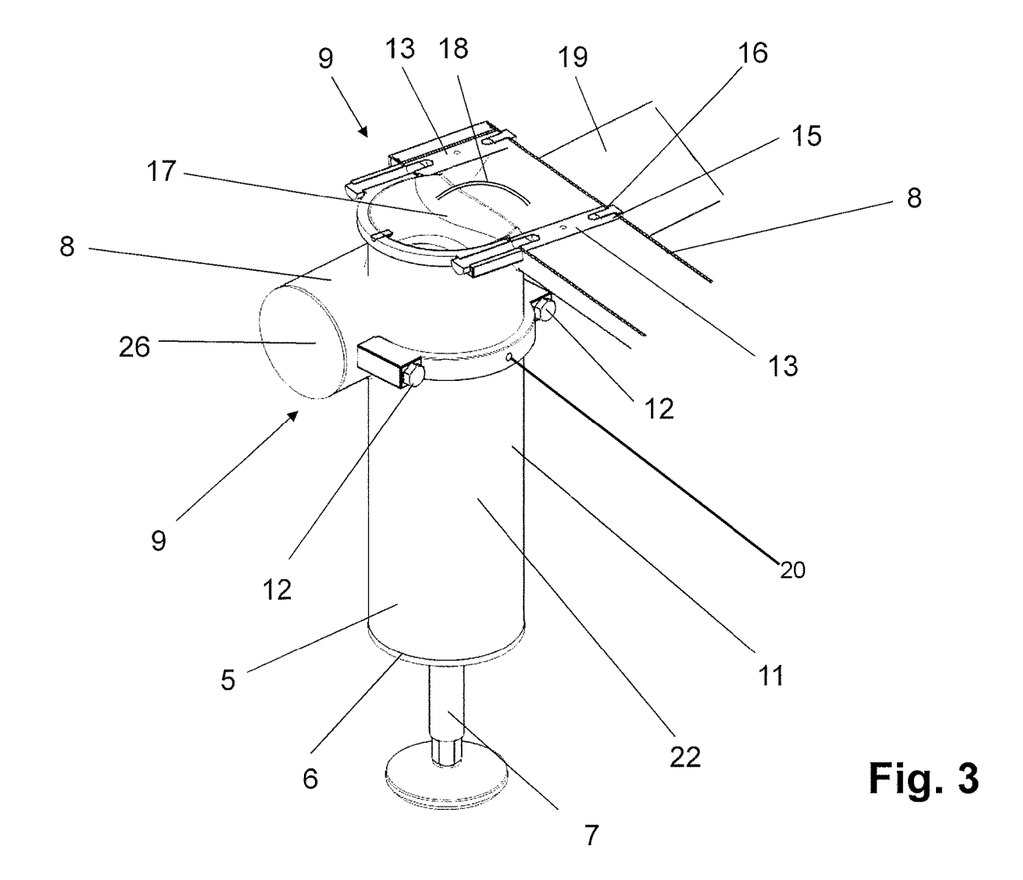
FIGS. 3 and 4 show the connection from FIG. 2 from different viewing directions.

Referring to FIG. 3, the connecting element 8 includes third and fourth openings 15 opposite the first and second openings 14 to receive third and fourth screws 16. The third and fourth screws 16 connect the spacing elements 13 to the connecting element 8. The third and fourth 16 connect by ends remote from the first and second screws 12, As can be seen in FIG. 3, in the region of the connection 9, the housing 5 has an opening 17 that provides a connection between the housing's interior and the following connecting element 8. This permits passage of lines 18 through the connecting elements 8 and into the individual stars 3, with the lines being fully protected and covered. Examples of such lines are electrical supply lines and control lines or lines that are used in connection with driving and control.

To separate the lines 18, it is useful to provide a plate-shaped separation insert 19. Such a separation insert 19 is a flat structure that is held at its ends at the spacing elements 13 of each connection 9 of a connecting element 8. An example of a separation insert 19 can be seen in FIGS. 3 and 4.

To promote more precise orientation of the connecting element 8 relative to the housing 5 and the connection 9, a centering pin 20 engages a centering opening 21 formed in the clamping bar 11

Figure 5:
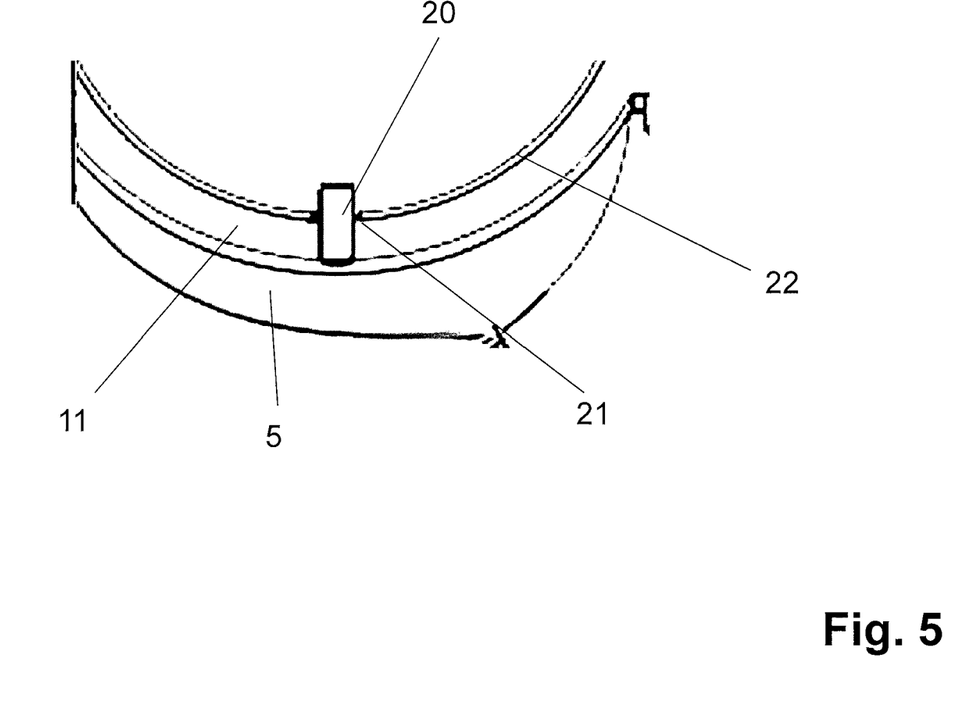
FIG. 5 shows details from FIG. 4.

Referring to FIGS. 3-5, a centering pin 20 engages a centering opening 21 formed in the clamping bar 11. The centering pin 20 can be secured by laser welding.

Alternatively, the centering pin 20 can be provided at the clamping bar 11 and the centering opening 21 can on the housing 5.

The use of a centering pin 20 and centering opening 21 as shown promotes more precise orientation of the connecting element 8 relative to the housing 5 at the connection 9.

Figures 10, 11:
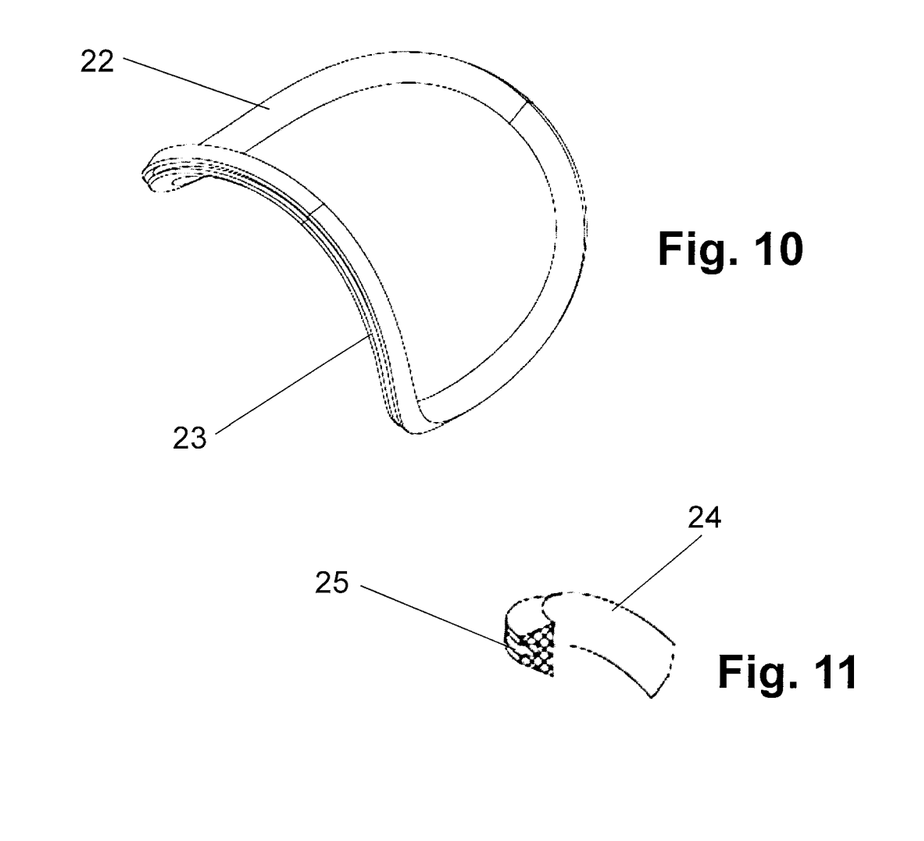
FIGS. 10 and 11 show seals for use with the container conveying segment from FIG. 1.

FIG. 10 shows a seal 22 that seals a transition between the housing 5 and the connecting element 8 in the region of the cut-out opening 10. A groove 23 on the seal's edge engages an edge 10.1 of the cut-out opening 10. As a result, clamping the connecting element 8 to the housing 5 presses the side of the seal 22 that is opposite the groove 23 against the outer surface of the housing 5. It also presses the groove's base surface against the edge of the cut-out opening 10.

The seal 22 prevents foreign substances from penetrating into the housing's interior and that of the conveying elements 8. Such foreign substances include fluids, such as cleaning and/or disinfection media.

The seal 24 shown in FIG. 11 forms a ring matched to the shape of the clamping bar 11 and has a groove 25 on its outside to accommodate the clamping bar 11. As a result, the seal 24 seals the connection 9 in the region of the centering pin 20 and the centering opening 21. After clamping the connecting element 8 to the housing 5, the seal's concave inner side presses against the outside of the housing 5 and the base of the groove 25 presses against the concave inner side of the clamping bar 11.

During assembly, the centering pin 20 automatically perforates the seal 24 as it moves into the centering opening 21. As a result, it is unnecessary to provide a special opening for the passage of the centering pin 20 at the time of the seal 24 is made.

A cover 26 at each end of the connecting element 8 forms a tight seal with a sealing ring. Each cover 26 is a shaped part made of metal or plastic that is pressed onto, latched, or clamped to the connecting element 8.

It is not necessary that the connecting element be formed by a tube that extends between housings 4. As shown in FIG. 1, the connecting element 8 can also be a multi-part structure. In some embodiments, the connecting element 8 has two tubular end pieces 8.1 and a middle section 8.2. The cut-out openings 10 are formed in the end pieces 8.1 and the middle section 8.2 connects the end pieces 8.1.

In some embodiments, the housing 5 includes, at least in the vicinity of the connection 9, defines a cross-section that is something other than circular.

Having described the invention, and a preferred embodiment thereof, what we claim as new and secured by Letters Patent is:

1. An apparatus comprising a container conveyor for conveying suspended containers, wherein said container conveyor comprises a first conveying element and a first connecting element, wherein said first conveying element comprises a housing and an advancing wheel, wherein said housing is selected from the group consisting of a columnar housing and a tubular housing, wherein said advancing wheel is driven such as to rotate about a machine axis, wherein said advancing wheel comprises container receptacles, wherein said first connecting element is projects laterally, wherein said first connecting element is tubular, wherein said first connecting element is clamped to said housing at a first connection to support said housing and to connect said housing to a structure, wherein said structure is selected from the group consisting of a second conveying element and a machine frame, wherein said connecting element comprises a first end and a first cut-out opening, wherein said first cut-out opening is disposed at said first end, wherein said connecting element forms said first connection using said first cut-out opening, wherein said connecting element is located laterally such as to fit onto a circumferential surface of said housing, wherein said connecting element has a longitudinal extension that is oriented tangential to said circumferential surface, and wherein said connecting element is secured to said housing.

2. The apparatus of claim 1, wherein said housing comprises, at least in a region of the first connection, a circular-cylindrical outer surface or casing surface.

3. The apparatus of claim 1, further comprising a clamping bar, wherein the clamping bar clamps the first connecting element to the housing and wherein the clamping bar engages around the housing.

4. The apparatus of claim 1, wherein the structure with which the housing is to be connected is selected to be the second conveying element, wherein the first and second conveying elements follow one another in a container-conveying direction, wherein the second conveying element has the same features as the first conveying element, wherein the first connecting element comprises a second end at which there exists a second cut-out opening, wherein the first connecting element uses the second cut-out opening to form a second connection, and wherein the second connection connects the first connecting element to the housing of the second conveying element, whereby the first connecting element connects the housings of the first and second conveying elements.

5. The apparatus of claim 1, further comprising a pin guide at said first connection, wherein the pin guide defines an orientation of the first connecting element relative to the housing.

6. The apparatus of claim 5, wherein the pin guide comprises a centering pin and a centering opening, wherein the centering pin engages the centering opening.

7. The apparatus of claim 6, further comprising a clamping bar, wherein the centering pin is provided at the clamping bar and wherein the centering opening is provided at the housing.

8. The apparatus of claim 7, further comprising a clamping screw for said clamping bar and a spacing element inside said first connecting element, wherein the spacing element forms a threaded element, wherein said clamping screw engages through an opening in said first connecting element into a thread of said threaded element, and wherein said spacing element is connected to said first connecting element at an end remote from said clamping screw.

9. The apparatus of claim 6, further comprising a clamping bar, wherein the centering pin is provided at the housing and the centering opening is provided at the clamping bar.

10. The apparatus of claim 1, further comprising at least one of lines and cables, wherein the housing comprises an opening in a region of the first connection, where said opening connects an interior of said first connecting element with an interior of said housing, wherein said first connecting element guides said at least one of lines and cables into said housing.

11. The apparatus of claim 1, further comprising a separation insert, wherein said separation insert is in said first connecting element, and wherein said separation insert extends between said first connection and a second connection.

12. The apparatus of claim 1, further comprising second and third conveying elements, wherein said first, second, and third conveying elements connect to one another in a container-conveying direction.

13. The apparatus of claim 1, further comprising a second connecting element, wherein said first connecting element connects said housing of said first conveying element to a second conveying element, wherein said second connecting element connects said housing of said first conveying element to a third conveying element, wherein said first and second connecting elements are offset from each other along said machine axis, and wherein said first and second connecting elements are oriented such that said longitudinal extension of said first connecting element forms an angle relative to a longitudinal extension of said second connecting element.

14. The apparatus of claim 1, wherein the housing comprises, at least in a region of the first connection, is formed from a tube piece with a circular-cylindrical outer surface or casing surface.

15. The apparatus of claim 14, further comprising a cover, wherein said cover closes ends of said tube piece.

16. The apparatus of claim 1, further comprising seals for sealing said first connection in a region of said first cut-out opening.

17. The apparatus of claim 1, wherein said connecting element is a single piece.

18. The apparatus of claim 1, wherein said connecting element is a multi-part connecting element.

19. The apparatus of claim 1, wherein said connecting element comprises a first end piece, a second end piece, an intermediate piece, and a second cut-out opening, wherein said intermediate piece is between said first and second end pieces, wherein said intermediate piece is tubular, wherein said first cut-out opening is on said first end piece, and wherein said second cut-out opening is formed on said second end piece.

20. The apparatus of claim 1, further comprising a seal, a centering pin, and a centering opening, wherein said seal seals said centering pin and said centering opening, wherein said seal is configured such that, when forming said first connection, clamping said connecting element to said housing causes said centering pin to perforate said seal.

* * * * *